United States Patent [19]

Thirion

[11] 4,047,153
[45] Sept. 6, 1977

[54] STATISTICAL DATA DETECTION METHOD AND APPARATUS

[75] Inventor: Philippe Emmanuel Thirion, Saint-Paul-de-Vence, France

[73] Assignee: International Business Machines Corporation, Armonk, N.Y.

[21] Appl. No.: 747,767

[22] Filed: Dec. 6, 1976

[30] Foreign Application Priority Data

Dec. 9, 1975 France .............................. 75.38562

[51] Int. Cl.² .............................................. G06K 9/00
[52] U.S. Cl. .......................... 340/146.3 AQ; 235/177; 325/320; 325/473; 340/146.2
[58] Field of Search ............. 340/146.3 H, 146.3 AQ, 340/146.3 Q, 146.3 MA, 146.2, 173 SP; 358/282, 188; 325/321, 323, 472, 473, 487, 320; 179/15 R, 15 A; 343/203; 235/177

[56] References Cited

U.S. PATENT DOCUMENTS 3,902,160    8/1975    Kawa .......................... 340/146.3 AQ

OTHER PUBLICATIONS

Chang, "Finding Prototypes for Nearest Neighbor Classifiers," *IEEE Trans. on Computers*, vol. C-23, No. 11, Nov. 1974, pp. 1179-1184.
Cutaia, "Multilevel Character Recognition System,"
*IBM Tech. Disclosure Bulletin*, vol. 13, No. 12, May 1971, pp. 3739-3742.

*Primary Examiner*—Leo H. Boudreau
*Attorney, Agent, or Firm*—Delbert C. Thomas

[57] ABSTRACT

A statistical data detection method for use in a synchronous data transmission system employing either phase modulation, combined amplitude and phase modulation or quadrature amplitude modulation. The signal space diagram of the possible states of the transmitted signal and their influence zones is divided into N elementary squares. Since the squares are rather coarse to save storage space, many such squares belong to more than one influence zone. The influence zone of a state Z defines the region within which the received signal, P, will lie when state Z has been transmitted.

A word in a ROM is assigned to each elementary square, and each word comprises two entries. The entries are identical when a square falls wholly within a single influence zone. Otherwise, the entries are different. Parts of the received signal are converted into an address for addressing the ROM. If the two entries of the word read from the ROM are identical, detection is completed, the transmitted state is the state represented by the entries. If the two entries are different, however, signifying two different states, the square of the distance between P and each of the two states is computed. The closer state is indicated as the most probable transmitted state.

7 Claims, 6 Drawing Figures

FIG. 1

PRIOR ART

STATISTICAL DATA DETECTION METHOD AND APPARATUS

This invention relates to synchronous data transmission systems and, more particularly, to both a statistical data detection method and apparatus for a synchronous data transmission system wherein the phase of the received signal is representative of the transmitted data.

Digital data transmission systems are normally comprised of a transmitter and a receiver connected to each other through a transmission channel. In such a system, the digital data, or bits, to be transmitted occur in the form of a bipolar binary pulse sequence having abrupt transmissions and the frequency spectrum of which is theoretically from zero to infinity. For saving costs, the telephone lines of the public network are very often utilized as transmission channels. Since these lines, in most cases, have a limited band-pass, namely 300–3000 Hz, the frequency range of the bipolar binary pulses must be translated to the 300–3000 Hz frequency band appropriate to transmission through these lines. Modulation, a multiplication process where the signal which carries the information is multiplied by a sinusoidal carrier, performs such a translation. In particular, this invention concerns those data transmission systems wherein the carrier phase is representative of at least a part of the transmitted data. These transmission systems more specifically include those systems which make use of phase modulation, phase modulation combined with an amplitude modulation and quadrature amplitude modulation which systems are known in the literature under the terms PSK modulation (Phase-Shift-Keyed), A-PSK modulation (Amplitude-Phase-Shift-Keyed), and QAM modulation (Quadrature-Amplitude-Modulation), respectively. PSK modulation is a modulation technique in current use and a detailed description thereof can be easily found in the following books: "Data Transmission" by W. R. Bennett and J. R. Davey, Chapter 10, McGraw-Hill Editions, New York, 1965, and "Principles of Data Communications" by R. W. Lucky, J. Salz, and E. J. Weldon, Jr., Chapter 9, McGraw-Hill Editions, New York, 1968. In those digital data transmission systems, which employ PSK modulation, the bit sequence to be transmitted is, first, converted into a sequence of symbols wherein each symbol can be any one of a number of symbols, which number, generally, is a power of 2. Then, these symbols are transmitted one by one at regularly spaced time intervals (T second), the so-called signaling times, by varying the carrier phase in accordance with the symbol selected at each signaling time. In some digital data transmission systems, where the purpose is to increase the data transmission speed without increasing the signaling rate, A-PSK modulation is utilized which consists in superimposing a modulation of the carrier amplitude on the PSK modulation. For instance, for a given data signaling rate F, when making use of an eight-phase PSK modulation, a data transmission rate of 3F bits/sec. is obtained, since three bits can be transmitted at each signaling time whereas, when making use of a two-amplitude level, eight-phase A-PSK modulation, a data transmission rate of 4F bits/sec. can be obtained since four bits are transmitted at each signaling time. QAM modulation is a type of modulation which is increasingly utilized and a description thereof will be found, for instance, in the above-mentioned book by R. W. Lucky et al. in Chapter 7 and, more particularly, under paragraphs 7-1-5 and 7-4-1 of this chapter. Briefly, in those digital data transmission systems which employ QAM modulation, the bit sequence to be transmitted is first converted into two independent symbol sequences. One symbol, in each of these sequences, is simultaneously transmitted at each signaling time by varying the amplitude of an associated one of two quadrature subcarriers in terms of the values of these symbols. The two subcarriers are of the same frequency and are phase-shifted 90° with respect to each other. Then, the two subcarriers are combined and applied to the input of the transmission channel.

The carrier modulated by any one of the above modulation techniques is applied to the input of the transmission channel. The function of the transmission channel is to produce a signal at its output end which is relatively similar to the signal which has been applied to its input. It has been mentioned above that telephone lines are very often utilized as transmission channels. The telephone lines are well adapted for voice transmission but are not designed to be capable of digital data transmission at high speed, say 9600 bits/sec., with a very low error probability. Indeed, the telephone lines introduce disturbances which adversely affect the quality of data type signals while they are being transmitted over the lines, and which disturbances make difficult a correct detection of the transmitted data by the receiver. These disturbances mainly include amplitude and phase distortions caused by the characteristics of the line and various noise components which are more particularly due to the intermediate signal processing for transmission purposes by the public telephone network. The amplitude and phase distortions entail an interaction between the successively transmitted signals, i.e., the so-called intersymbol interference. The noise components more specifically include phase shift, which is known in the literature under the term "phase intercept," frequency shift, phase fluctuation, known in the literature under the term "phase jitter," and white noise.

The intersymbol interference and the noise components have no practical effect in low speed, digital data transmission systems, i.e., for speeds of 2400 bits/sec. and lower but interfere with data detection in a higher speed system of the type mentioned above. It is, therefore, necessary to provide the receiver of a high speed system with devices to minimize the effects of intersymbol interference and noise components, to enable correct detection of the data. The effects of the intersymbol interference may be minimized by an appropriate device, known under the term "equalizer," which is not within the scope of this invention. The effects of the noise components are minimized by the here described data detection system.

French patent application No. 74 43560, filed by the Assignee of this application in France on Dec. 27, 1974, and corresponding to U.S. patent application Ser. No. 629,460, filed Nov. 6, 1975, in the names of A. Croisier and A. Desblache, discloses a data detection system with which it is possible to correctly detect data transmitted by modulation of a carrier from the phase and quadrature components of the received signal. The in-phase and quadrature components of the received signal are applied to a phase rotation device which causes the phase of the received signal to be rotated by an estimated value of the phase error produced by the noise components generated in and by the transmission channel. The new in-phase and quadrature components supplied by the phase rotation device are applied to a decision logic wherein they are compared with the possible coordinates of the state of the carrier. A pair of said coordinates is selected as being representative of the received data with respect to a given selection criterium. The decision logic also supplies the phase error components to a first conversion device which produces the value of the residual phase error from these components. The residual phase error is supplied to a predictive filter which produces an estimated value of the phase error. The latter is applied to a second conversion device which converts the estimated value of the phase error into trigonometric sine and cosine functions to control the phase rotation device.

The performance of high speed data transmission systems are very sensitive to the choice of the different states which can be assumed by the carrier during a signaling time. Two factors influence such a choice; they are the noise sensitivity of these states and the cost of both transmission and detection of these states. In the above-cited U.S. patent application, Ser. No. 629,460, there is disclosed a decision logic implementing the following selection criterium: the coordinate pair representative of the data to be chosen must be the pair nearest to the component pair applied to the input of the decision logic. However, upon testing this selection criterium, it did not prove to be the best and the computing power necessary for its decision logic proved to be overly complicated.

An object of this invention is to provide for an improved detection method and apparatus which can be used instead of the decision logic involved in the data detection system disclosed in the above-mentioned patent application.

Another object of this invention is to provide for a low cost data detection method and apparatus requiring little computing power regardless of the different states which can be assumed by the carrier.

Another object of this invention is to provide for a data detection method and apparatus available for adaptation to compensate for different combinations of noise components, thereby providing a better immunity from these noise components.

Generally, this invention discloses a data detection method and apparatus for a synchronous data transmission system in which the phase of the received signal is representative of data, and according to this method, the signal space diagram which is illustrative of the distribution of the signal states in the coordinate plane, is divided into elementary squares and these squares are allocated into influence zones of the coordinate points representative of the possible states of the transmitted signal, i.e., the data points.

A two component word of a read-only memory is associated with each elementary square. When the elementary square associated with a word is wholly within a single influence zone, the two components of this word are identical and identify the data point for that influence zone. When the elementary square associated with a word is partly within each of two adjacent influence zones, the two components of this word are different and identify the two data points of these adjacent influence zones.

To address the read only memory, the in-phase and quadrature components of the received signal are converted into the address of an elementary square representative of the received signal. This address is utilized to read the associated word from the read-only memory. When the two components of the read word are identical, the square is entirely within one influence zone and the data point corresponding to these components is selected as representing the transmitted data. When the two components of the read word are different, the exact distance between the received point in the elementary square and the two reference points corresponding to these components is calculated. The data point corresponding to the shorter distance is then selected as identifying the transmitted data.

This invention will be further explained, by way of a preferred embodiment with reference to the accompanying drawings, in which.

Figure 1:
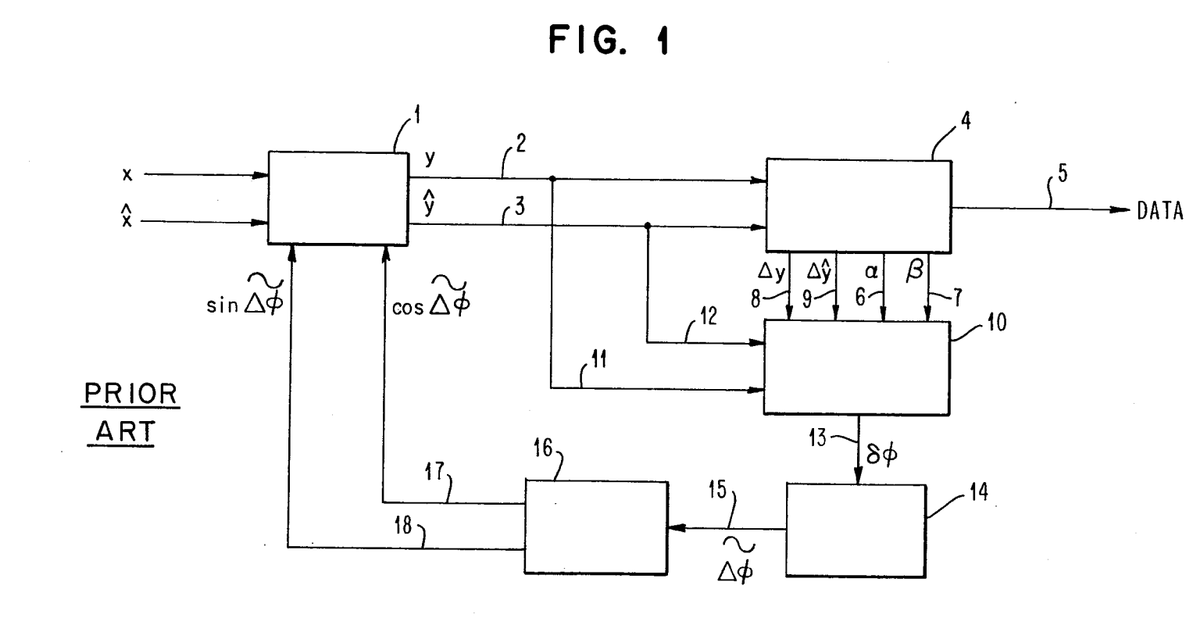
FIG. 1 is a prior art data detection system in which the device according to this invention may be used.

In order to place the present invention in its context, FIG. 1 illustrates the data detection system disclosed in the above-mentioned U.S. patent application No. 629,460. The in-phase and quadrature components of the received signal, equalized, if necessary, and designated by $x$ and $\hat{x}$, respectively, are applied to the input of a phase rotation device 1 which causes the input signal represented by components $x$ and $\hat{x}$ to be rotated by an angle equal to $-\Delta\hat{\Phi}$, where $\Delta\hat{\Phi}$ is representative of an estimated phase error value. Phase rotation device 1 supplies on lines 2 and 3, respectively, the in-phase and quadrature components $y$ and $\hat{y}$, of the signal which has been rotated by angle $-\Delta\hat{\Phi}$. The components $y$ and $\hat{y}$ are applied through lines 2 and 3, respectively, to the input of a data detection device 4 which supplies the detected data on output line 5. Detection device 4 supplies the coordinates $\alpha$ and $\beta$ of the data state which has been selected as being the most probable state of the transmitted carrier, and is representative of the data and also supplies the residual phase error components $\Delta y$ and $\Delta\hat{y}$, all of which signals are applied to a first conversion device 10 through lines 6, 7, 8 and 9, respectively. Conversion device 10 also receives components $y$ and $\hat{y}$ via lines 11 and 12 and supplies the residual phase error value $\delta\phi$ at its output line 13. Line 13 is the input of a predictive filter 14. Predictive filter 14 supplies the estimated phase error value $\Delta\hat{\phi}$ at its output 15, which is connected to the input of a second conversion device 16 supplying the trigonometric function values $\cos\Delta\hat{\phi}$ and $\sin\Delta\hat{\phi}$ ver lines 17 and 18, respectively, to phase rotation device 1.

For more details relative to the system shown in FIG. 1, reference should be made to the above-mentioned U.S. patent application.

Figure 2:
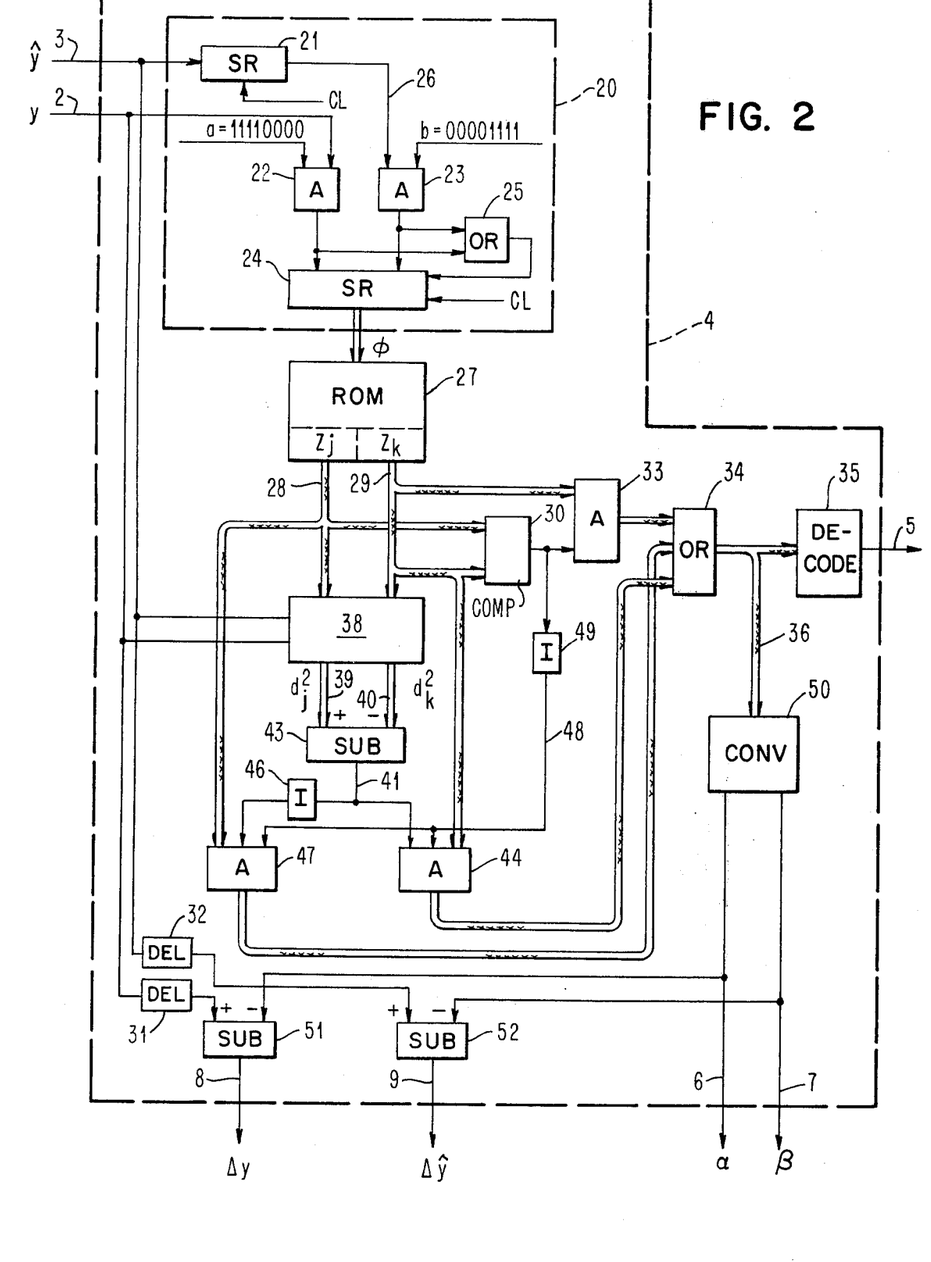
FIG. 2 is a schematic diagram of the data detection device of this invention.
Figure 4:
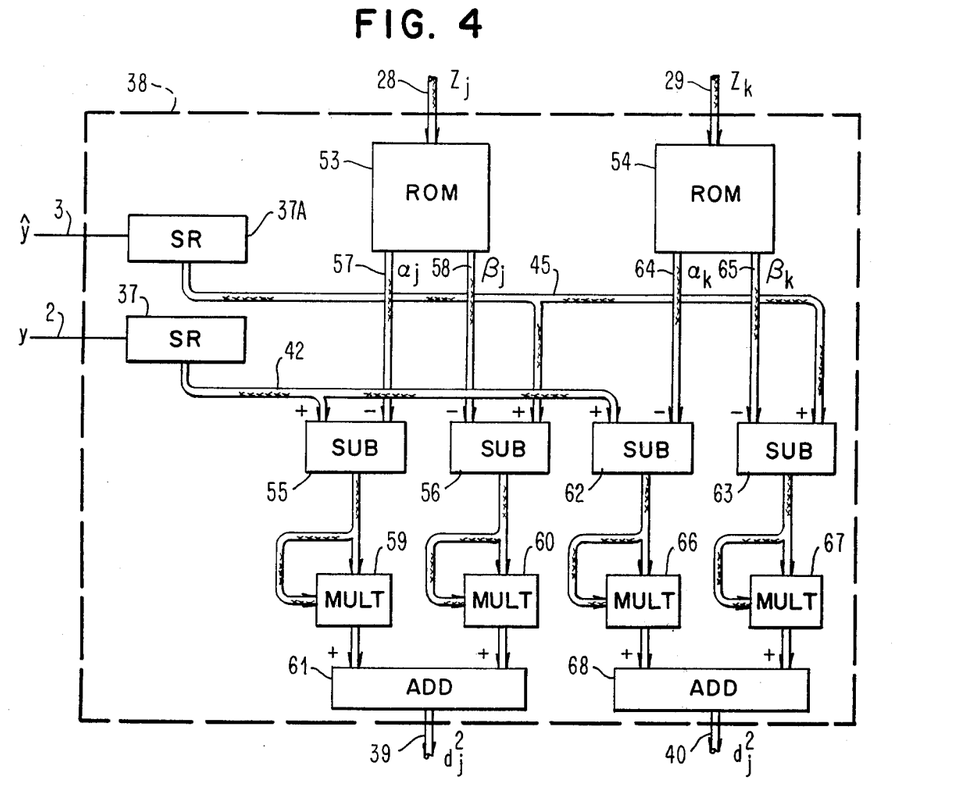
FIG. 4 is an example of one form of implementation of the distance computing device shown in the form of a block in FIG. 2.
Figure 5:
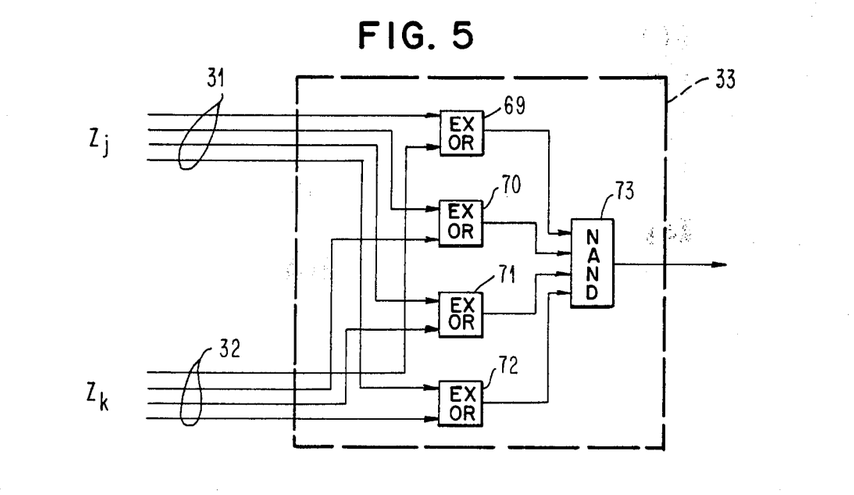
FIG. 5 is an example of one form of implementation of an inverted Exclusive OR circuit used in the device according to this invention.

FIG. 2 is an example of the digital implementation of a detection device according to this invention, which device can be utilized as detector 4 of the system shown in FIG. 1. The components $y$ and $\hat{y}$ of the received signals $x$ and $\hat{x}$ which have been equalized, if necessary, and corrected for the estimated phase error are applied, in the form of serial bits through lines 2 and 3, respectively, to the input of an addressing device 20. Addressing device 20 is comprised of a shift register 21 with four stages of one bit each, two AND gates 22 and 23, respectively, an OR 25 and a shift register 24. Line 2 is connected to an input of AND gate 22 whose other input receives a serial sequence of bits of a mask $a$ which will be later defined. Input line 3 is connected to an input of four bit shift register 21 which will delay the $\hat{y}$ signal for four bit times and then send it over line 26 to an input of AND gate 23. The other input of AND gate 23 receives the serial mask quantity $b$ which will be later defined. The outputs of AND gates 22 and 23 are passed through OR 25 into shift register 24. The output of register 24 is applied as a parallel eight bit address $\Theta$ to the input of read-only memory (ROM) 27. ROM 27 has two four bit outputs 28 and 29 which are connected, through busses 28 and 29, to the two inputs of comparing device 20 comprised of inverted Exclusive OR circuits. This circuit 30 is illustrated in FIG. 5. The output of Exclusive OR circuit 30 is connected to an input of AND gates 33 the other input of which is connected to bus 29. The output bus of AND gates 33 is connected to one input of OR gate 34, the output of which is connected to the input of a decoding circuit 35. The output of circuit 35 supplies the detected data over output line 5. The two outputs 28 and 29 of ROM 27 are also connected to the input of a distance computation device 38, one implementation of which will be described with reference to FIG. 4. This device 38 also receives components $y$ and $\hat{y}$ from lines 2 and 3. Device 38 has two outputs 39 and 40 which carry signals representing coordinate distances and which are respectively connected to the additive and subtractive inputs of subtractor 43 which performs a comparison operation. The output line 41 of subtractor 43 indicates which input line 39 or 40 carries the larger distance representation and is connected to an input of AND gate 44, another input of which is connected to line 29, through line 45. The output of subtractor 43, is also connected to the input of an inverter 46 whose output is an input of an AND gate 47. Another input of AND gate 47 is connected to line 28. The outputs of AND gates 44 and 47 are connected to the input of decoding circuit 35 through OR gate 34. The third inputs of AND gates 44 and 47 are connected to the output of a logic inverter 49, the input of which is connected to the output of inverted Exclusive OR circuit 30. In order to be used with the system of FIG. 1, the device shown in FIG. 2 is further provided with a conversion device 50 whose input is connected to the output bus 36 of OR circuit 34, and its output on line 6 is connected to the subtractive input of a subtractor 51 whose additive input is connected to line 2 through a delay 31. Output line 7 of converter 50 is connected to the subtractive input of a subtractor 52, the additive input of which is connected to line 3 through a delay 32. The outputs of subtractors 51 and 52 are connected to lines 8 and 9 (FIG. 1), respectively.

Figure 3A:
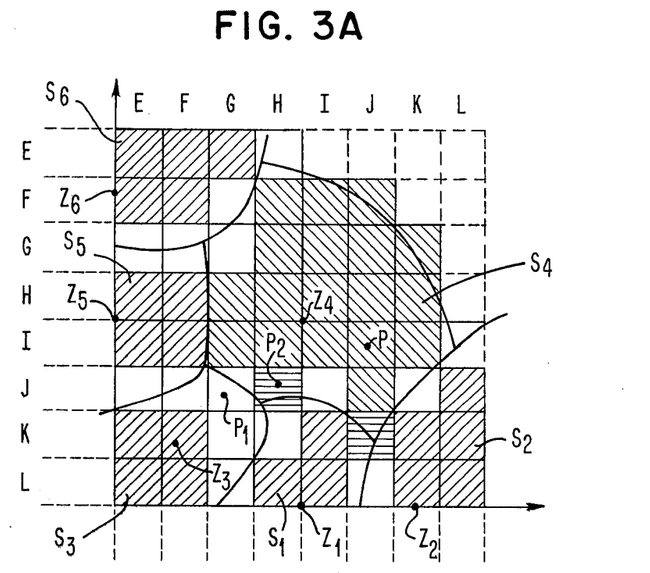
FIGS. 3A and 3B, are schematic signal space diagrams which help to make the invention clearer.
Figure 3B:
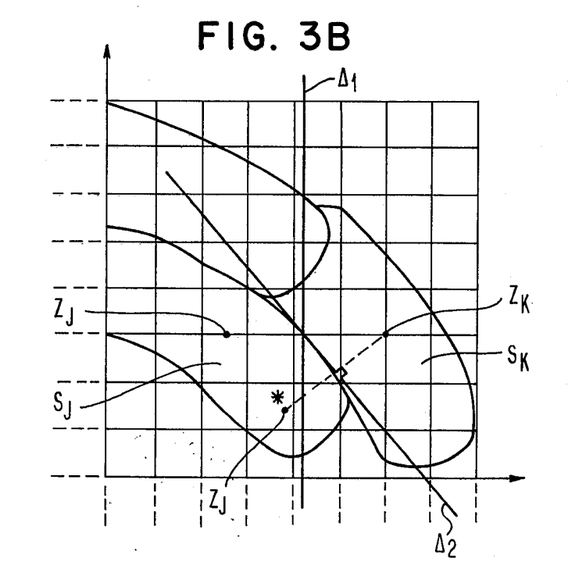

The operation of the device according to this invention will now be described with reference to FIGS. 2 and 3. In the field of data transmission, the distribution of the different states which can be assumed by the signal received from the transmission line at each signaling time can be represented by a diagram, the so-called signal space diagram. For a better understanding of this invention, FIG. 3A shows the first quadrant of such a diagram for a transmission system employing a 16-state QAM modulation. The other three quadrants are processed similarly to the first quadrant. The six points $Z_1$ through $Z_6$ which, in the following description, will be referred to as data points, are representative of the six first quadrant possible states of the 16 possible states of the transmitted signal, the remaining ten states being in the quadrants which are not shown. The horizontal and vertical coordinates of each of said points are representative of the amplitude of the in-phase and quadrature components of the transmitted signal for that state. The effects of the noise components, such as those mentioned above, though reduced owing to the other components of the system of FIG. 1, are such that when, for example, point $Z_4$ is transmitted, point P is representative of the signal as received and point P will not usually be coincident with point $Z_4$, but will lie within a zone $S_4$, the so-called point $Z_4$ influence zone. It should be noted that the different noise components modify the transmitted signal in a different way, and because different noise components are more or less preponderant according to the transmission channel utilized, the influence zones are generally not of a regular shape. For instance, it is a well-known fact that when the phase jitter is preponderant, there is obtained an elongated influence zone, a so-called "bean" -shaped zone which will be described in more detail further on. In the diagram, the portions of the six influence zones of points $Z_1$ through $Z_6$, which are in the first quadrant, have been referred to as $S_1$ through $S_6$.

With this brief description of the noise component effects upon the transmitted signal, as far as the signal space diagram is concerned, the function of the detection method and device according to this invention will now be described. The space diagram is considered as divided into elementary squares. FIG. 3A illustrates the elementary squares of the first quadrant, which have been identified by two letters according to their coordinates. Since, for implementation purposes of this invention the squares must be selected as of an appreciable size, some of the squares can include points belonging to more than one influence zone. From the figure, the diagonally lined squares are those belonging wholly to a single influence zone, the white squares are those having points belonging to two adjacent influence zones, and the horizontally lined squares are those belonging to three influence zones.

Upon detection, three cases may arise:

Case 1: The point P representative of the received signal is found in a diagonally lined square belonging to a single zone, for instance, zone $S_4$. Data point $Z_4$ is then unambiguously selected as being representative of the transmitted signal.

Case 2: The point, such as $P_1$, representative of the received signal is found to be in a white square belonging to two adjacent influence zones, for instance, zones $S_3$ and $S_4$ and its meaning is ambiguous. This ambiguity can be removed by more precisely computing the distance between the received point $P_1$ and two reference points, one taken in each of the pertinent zones $S_3$ and $S_4$. Generally, the points chosen as reference points will be the data points $Z_n$ of the pertinent influence zones. Further on in this description, there will be given another way to choose the reference points for special cases. In the chosen example, the points chosen as reference points will be the data points $Z_3$ and $Z_4$. Whichever one of points $Z_3$ or $Z_4$ is nearest to the point representation of the received signal will be selected as being representative of the transmitted signal.

Case 3: The point $P_2$ representative of the received signal stands in a horizontally lined square belonging to three adjacent influence zones, for instance, zones $S_1$, $S_3$ and $S_4$, and its decoding will also be ambiguous. As stated in Case 2, this ambiguity can also be removed by measuring the distance between the received point and the reference points of the three adjacent zones and selecting the reference point nearest to the received point as representing the transmitted signal.

With reference to FIG. 2, components $y$ and $\hat{y}$ of the received signal, are the coordinates of the received point, and are applied to the input of addressing device 20. It will be assumed that each component is digitally coded in the form of an eight-bit serial word. The function of addressing device 20 is to supply an address $\theta$ representative of the elementary square which contains the received point P. In the example considered, it has been assumed that the diagram was divided into four quadrants of 64 elementary squares each or a total of 256 elementary squares any one of which could be identified by an eight-bit word. Address $\theta$ is obtained by forming an eight-bit word with the four most significant bits (MSB) of component $y$ and the four most significant bits (MSB) of component $\hat{y}$. The four most significant bits of $y$ are obtained by performing the logical AND function of component $y$ and of the eight-bit mask word $a = 11110000$, both with the most significant bits appearing first, through AND gate 22. The four most significant bits of $\hat{y}$ are obtained by delaying the $\hat{y}$ component four bit times in its passage through shift register 21 and by then performing the logical AND function of the delayed $\hat{y}$ component and of the eight-bit mask word $b = 00001111$, most significant digit first, through AND gate 23. The four most significant bits of $y$ supplied through AND gate 22 pass through OR 25 and are loaded first into four stages of register 24. Then the delayed four most significant bits of $\hat{y}$ supplied through AND gate 23 to OR 25 are loaded into the other four stages of register 24 to provide address $\theta$ in register 24. Address $\theta$ is utilized to address one of the 256 words written in read-only memory 27. Each word stored in ROM 27 is eight-bits long and is comprised of two entries identifying two data points $Z_j$ and $Z_k$, respectively. Each entry is four-bits long which is sufficient to identify one of the sixteen different points $Z_n$. Each word in ROM 27 corresponds to one elementary square and in a word corresponding to a square belonging to only one influence zone, e.g., zone $S_4$, the two entries and are identical and identify point $Z_4$. If the word corresponds to the address of a square belonging to two adjacent influence zones, e.g., $S_3$ and $S_4$, the two entries $Z_j$ and $Z_k$ are different. The entry $Z_j$ will identify one of the points $Z_3$ or $Z_4$, and entry $Z_k$ will identify the other one. According to this aspect of the invention, Case 3, wherein a square belongs to three adjacent influence zones, is not considered. Indeed, in a transmission system making use of a 16-state QAM modulation, with an over-all error rate of $10^{-5}$, and with the diagram divided into 256 elementary squares, it has been found that the probability of occurrence of Case 3 is lower than about $10^{-12}$. This probability is so much lower than the error ratio of the system that any additional error incurred by not taking Case 3 into account is insignificant and can be included as a part of the overall error rate.

The two four-bit entries $Z_j$ and $Z_k$ of the word read from ROM 27 are applied to the input of inverted Exclusive OR comparing circuit 30 which supplies a high logic level, binary state 1, only when the two entries $Z_j$ and $Z_k$ are identical. A high output level from Comparer 30 conditions AND gate 33 and causes one of the identical entries $Z_k$ read from ROM 27 to be transferred from bus 29 to the input of decoding circuit 35, through AND gate 33 and OR 34. The high level at the output of comparing circuit 30 is inverted by inverter 49 to decondition both AND gates 44 and 47. Decoding circuit 35 is a conventional logic circuit which is the reciprocal of the coding circuit of the transmitter in the transmission system. It supplies the detected data corresponding to the selected reference point $Z_k$ over line 5.

When the two entries $Z_j$ and $Z_k$ are different, the output of comparing circuit 30 is at a low level which deconditions AND gate 33 and through inverter 49 conditions AND gates 44 and 47 over their input line 48. Entries $Z_j$ and $Z_k$ are applied to distance computing device 38, through lines 28 and 29, which device 38 then supplies distance $d_j^2$ and $d_k^2$, at its outputs $d_j$ being the space diagram distance between the received point and the reference point corresponding to entry $Z_j$, and $d_k$ being the space diagram distance between the received point and the reference point corresponding to entry $Z_k$. Distances $d_j^2$ and $d_k^2$ are applied to the additive and subtractive inputs of subtractor 43, respectively. When $d_j^2$ is equal to or less than $d_k^2$, the output line 41 of subtractor 43 assumes a low level which deconditions AND gate 44. The low level signal on line 41 is inverted by inverter 46 to condition AND gate 47 which transfers entry $Z_j$ from ROM 27 to the input of decoding circuit 35, through bus 28, AND gate 47 and OR gate 34. When $d_j^2$ is greater than $d_k^2$, the output of subtractor 43 assumes a high level which conditions AND gate 44 to cause entry $Z_k$ to be transferred from ROM 27 to the input of decoding circuit 35 through bus 29, AND gate 44 and OR gate 34.

FIG. 2 illustrates additional means for further adapting the device of this invention to the detection system shown in FIG. 1. These means comprise conversion device 50 and a pair of subtractors 51 and 52. Device 50 is a read-only memory into which a table is stored which supplies on lines 6 and 7 the space diagram coordinates $\alpha$ and $\beta$ of the selected reference point which is identified by the signal on bus 36 from OR 34. Subtractor 51 supplies quantity $\Delta y = y - \alpha$ at its output and subtractor 52 supplies quantity $\Delta\hat{y} = \hat{y} - \beta$.

A slight modification of the above device according to this invention will now be described for the case where phase jitter is the predominant noise component. The effect of phase jitter is to rotate the received point about the origin. Said rotation causes the influence zones to assume an elongated shape, the so-called "bean" shape. Such elongated influence zones are illustrated in space diagram of FIG. 3B.

For Case 1 type squares, the above described method is not modified. However, for Case 2 squares, i.e., when there is possible ambiguity between two states, e.g., two states represented by points $Z_j$ and $Z_k$, and considering the shapes of the influence zones, it is not always advisable to solve the ambiguity by taking data points $Z_j$ and $Z_k$ as reference points, i.e., the space diagram distances between the coordinates of the received point and $Z_j$ and $Z_k$ should not be computed. Computing the distances between the received point and points $Z_j$ and $Z_k$ for the selection between these points, amounts to determining whether the received point is on one side or the other of a median line $\Delta_1$ of segment $Z_jZ_k$. This would not always give good results, for the diagram 3B shows that straight line $\Delta_1$ is not parallel to the boundaries of the influence zones $S_j$ and $S_k$ and the application of such a selection criterion could entail detection errors. For the purpose of this invention, it would be advisable to utilize a sloped straight line such as $\Delta_2$ as a decision limit instead of straight line $\Delta_1$. Straight line $\Delta_2$ is approximately tangent to the common boundary of influence zones $S_j$ and $S_k$, at a point near the middle of the common limit between $S_j$ and $S_k$. In that case, points $Z_j^*$ and $Z_k$, for instance, will be utilized as reference points, and the distances between the received point and points $Z_j^*$ and $Z_k$ will be computed. Point $Z_j^*$ is symmetrical to $Z_k$ with respect to straight line $\Delta_2$. This modification in computing the distances can be used in the distance computing device 38 implementation which is disclosed in FIG. 4. The reference point entries $Z_j$ and $Z_k$ written into the addressed word of ROM 27 are respectively applied over busses 28 and 29 to the inputs of two read only memories 53 and 54 each having a conversion table to change the four-bit signal on its input bus to the pair of coordinates for the referenced point. Tables 53 and 54 supply the coordinates of those reference points which respectively correspond to points $Z_j$ and $Z_k$ in FIG. 3A, or for the case illustrated in FIG. 3B, the memories 53 and 54 supply the coordinates of points $Z_j^*$ and $Z_k$, respectively. It should be noted that the use of read-only memories 53 and 54 entails a high flexibility in the choice of the reference points involved in the distance computation. Programmable read-only memories which have been commercially available for a long time could be advantageously utilized by the man skilled in the art who can then load therein the particular data he wants.

Coordinates $\alpha_j$ and $\beta_j$ of point $Z_j$ or $Z_j^*$ supplied by table 53 are respectively applied to the subtractive inputs of two subtractors 55 and 56, through busses 57 and 58, respectively. The additive inputs of subtractors 55 and 56 receive components $y$ and $\hat{y}$, respectively, through lines 42 and 45. To compensate for timing differences between the serial signals on lines 2 and 3 and the coordinate signals on busses 57 and 58, a shift register 37 is used to store the signals received from line 2 and a shift register 37A is connected to receive the signals on line 3. The stored signals are gated out to busses 42 and 45 when the $\alpha_j$ and $\beta_j$ coordinates are available from ROM 53. Subtractors 55 and 56, respectively, supply quantities $y-\alpha_j$ and $\hat{y}-\beta_j$, which quantities are squared by multipliers 59 and 60. The output quantities $(y-\alpha_j)^2$ and $(\hat{y}-\beta_j)^2$ supplied by multipliers 59 and 60 are respectively applied to the two inputs of an adder 61 which supplies at its output 39 the squared distance between the received point and point $Z_j$, or point $Z_j^*$, $$d_j^2 = (y-\alpha_j)^2 + (\hat{y}-\beta_j)^2$$

The coordinates $\alpha_k$ and $\beta_k$ of point $Z_k$, supplied by ROM 54, are applied to the subtractive inputs of two subtractors 62 and 63, through busses 64 and 65, respectively. The additive inputs of subtractors 62 and 63 receive components $y$ and $\hat{y}$, through busses 42 and 45, respectively. The outputs of subtractors 62 and 63, respectively, are squared by multipliers 66 and 67 whose outputs are connected to the inputs of an adder 68 which supplies the term $$d_k^2 = (y-\alpha_k)^2 + (\hat{y}-\beta_k)^2$$

at its output 40.

FIG. 5 illustrates one example of the implementation of inverted Exclusive OR comparator circuit 30, shown in FIG. 2. In this implementation of the Exclusive OR circuit, it is assumed that the bits of which entries $Z_j$ and $Z_k$ are composed are available in parallel at the output of ROM 27. The four bits of entry $Z_j$ respectively applied to the first inputs of four Exclusive OR circuits 69 through 72. The four bits of entry $Z_k$ are respectively applied to the second inputs of the same four Exclusive OR circuits 69 through 72 with the bits of same weights in $Z_j$ and $Z_k$ applied to the same Exclusive OR circuit. The outputs of Exclusive OR circuits 69 through 72 are applied to separate inputs of a NAND gate 73. It can be easily seen that the output of NAND gate 73 will assume a high level only when entries $Z_j$ and $Z_k$ are identical.

The preceding description has been given only as a preferred embodiment and it will be clear that numerous alternatives can be devised without departing from the spirit and scope of this invention as set out in the following claims.

What is claimed is:

1. A method for the decoding of data received in a synchronous data transmission system wherein a transmitted signal is varied in at least two characteristics to be representative of a transmitted data symbol, said method being characterized in that it includes the following steps:
   a. sampling each of said characteristics of said signal at a signal receiving location;
   b. forming a multipart character for each of said samples, each character having a more significant part and a less significant part;
   c. forming an address with the more significant part of each of the two characters associated with a symbol;
   d. addressing a storage table with said address, said storage table at each address storing an identification of at least two data symbols, said identifications being the same where the combined major parts of said characters unequivocally identify a transmitted data symbol and being different where said combined major parts may be formed for either of two almost equally probable transmitted data symbols, to read out the addressed word of said table;
   e. comparing the two readout identifications;
   f. selecting one identification as the identification of the transmitted symbol when said symbol is unequivocally identified;
   g. comparing all of both of said characters for a received signal with said characteristics for both of said identified transmitted data symbols when said identifications are different to select the more probable one of said identifications; and
   h. decoding the selected identification to determine said transmitted data symbol.

2. A data decoding method as set out in claim 1, characterized in that in said comparing step, said comparison may be biased in favor of one of said identifications to compensate for unequal effects of said transmission system on said characteristics.

3. A data decoding method as set out in claim 1, characterized in that in said comparing step, the difference between each of said characteristics as received from the nominal value of said characteristics for both identified symbols is determined for each of said symbols to generate the pseudo-distances for the received signal from each of the identified data symbols and the smaller pseudo-distance is used to select the more probable identification.

4. A device for the decoding of data received in a synchronous data transmission system wherein a transmitted signal is varied in at least two characteristics to be representative of a transmitted data symbol, said device including:

a. means for generating representations of samples of each of said two characteristics, each representation having a more significant part and a less significant part;

b. an address generator connected to said representation generating means to combine the more significant parts of said representations for one transmitted symbol to form an address;

c. a storage device addressed by said generator and having a storage location for each address producible by said address generator, said storage device containing a table having two data symbol identifications in each storage location, said identifications being the same if said generated address can be unequivocally assigned to a transmitted symbol representation and being different when said generated address identifies two almost equally probable data symbol representations;

d. comparing means connected to the output of said storage device to compare two read-out identifications;

e. an identification decoding means to convert an identification to a corresponding data symbol;

f. a gate activated by said comparing means when said identifications are the same, to pass one of said identifications to said identification decoding means;

g. a processor also connected to the outputs of said storage device to receive said identifications, said processor also connected to said representation generating means to receive both parts of each of said representations and operating to determine the more probable identification for said representations; and h. gating means connected to said processor and to said comparing means, to pass the more probable identification to said identification decoding means when said identifications read from said storage device are not identical.

5. A data decoding device as defined in claim 4, further characterized in that said processor includes:

$g_1$. a first memory device storing a conversion table having a pair of representations for each addressable storage location;

$g_2$. a second memory device storing a second conversion table having a pair of representations for each addressable storage location;

$g_3$. means connecting each memory device to receive a different one of said identifications from said storage device;

$g_4$. substracting means to find the differences between each of said sample representations and an associated representation from each said memory device;

$g_5$. selecting means connected to the outputs of said subtracting means to determine the more probable identification corresponding to said received representations; and $g_6$. connections from said selecting means to indicate which of said received identifications is selected.

6. A data decoding device as in claim 5, characterized in that the representations for an identification may be different in said first memory device from the representations for the same identification in said second memory device to compensate for non-symmetrical effects in said sample representations due to the parameters of said transmission line.

7. A data decoding device as set out in claim 4, characterized in that said address generator includes:

$b_1$. a shift register having an input and an output connected to said storage device;

$b_2$. a first mask controlled AND circuit between a part of said sample representation generator and the input of said shift register to pass the more significant part of one of said representations to said shift register input;

$b_3$. a signal delay means connected to another part of said sample representation generator to receive the other of said representations; and $b_4$. a second mask controlled AND circuit connected between the output of said delay means and the input of said shift register to pass the more significant part of said other representation to said shift register after its receipt of said more significant part of said one representation.

* * * * *